(12) United States Patent
Hood

(10) Patent No.: US 9,487,609 B2
(45) Date of Patent: Nov. 8, 2016

(54) PREMIXES SUITABLE FOR THE PRODUCTION OF MEMBRANE MATERIALS

(75) Inventor: David K. Hood, Basking Ridge, NJ (US)

(73) Assignee: ISP INVESTMENTS LLC, Wilmington, DE (US)

( * ) Notice: Subject to any disclaimer, the term of this patent is extended or adjusted under 35 U.S.C. 154(b) by 269 days.

(21) Appl. No.: 13/259,499

(22) PCT Filed: Mar. 26, 2010

(86) PCT No.: PCT/US2010/028852
§ 371 (c)(1),
(2), (4) Date: Dec. 13, 2011

(87) PCT Pub. No.: WO2010/111607
PCT Pub. Date: Sep. 30, 2010

(65) Prior Publication Data
US 2012/0077893 A1    Mar. 29, 2012

Related U.S. Application Data

(60) Provisional application No. 61/164,120, filed on Mar. 27, 2009.

(51) Int. Cl.
| | | |
|---|---|---|
| C08F 218/08 | (2006.01) | |
| C08F 220/04 | (2006.01) | |
| C08F 220/68 | (2006.01) | |
| C08F 226/06 | (2006.01) | |
| C08F 226/10 | (2006.01) | |
| C08F 220/28 | (2006.01) | |
| C08F 220/06 | (2006.01) | |
| C08F 220/58 | (2006.01) | |
| C08F 226/00 | (2006.01) | |
| C08F 220/18 | (2006.01) | |

(52) U.S. Cl.
CPC ........... *C08F 220/28* (2013.01); *C08F 218/08* (2013.01); *C08F 220/06* (2013.01); *C08F 220/58* (2013.01); *C08F 226/00* (2013.01); *C08F 226/06* (2013.01); *C08F 226/10* (2013.01); *C08F 2220/1883* (2013.01); *C08F 2220/281* (2013.01)

(58) Field of Classification Search
None
See application file for complete search history.

(56) References Cited

U.S. PATENT DOCUMENTS

| | | | | |
|---|---|---|---|---|
| 4,806,449 A | * | 2/1989 | Hofmann et al. | 430/281.1 |
| 5,571,860 A | * | 11/1996 | Kukkala et al. | 524/503 |
| 6,045,899 A | * | 4/2000 | Wang et al. | 428/315.7 |
| 7,300,022 B2 | | 11/2007 | Muller | |
| 8,242,224 B2 | * | 8/2012 | Hood et al. | 526/310 |
| 8,629,229 B2 | * | 1/2014 | Hood et al. | 526/310 |
| 2002/0162792 A1 | * | 11/2002 | Zepf | 210/500.21 |

FOREIGN PATENT DOCUMENTS

WO    WO 2009/023843 A1    2/2009

OTHER PUBLICATIONS

Kao et al., "UV Curable Bioadhesives: Copylymers of N-Vinyl Pyrrolidone," 1997, John Wiley & Sons, pp. 191-196.*
Sigma-Aldrich Product Specification for lauryl methacrylate, 2015, one page.*

* cited by examiner

*Primary Examiner* — Robert Sellers
(74) *Attorney, Agent, or Firm* — William J. Davis

(57) ABSTRACT

Premixes suitable for the production of membrane materials are described. Products of this invention are suitable for the formation of membranes and membrane modules that may be in the form of flat sheets, tubes, or hollow fibers.

5 Claims, No Drawings

PREMIXES SUITABLE FOR THE PRODUCTION OF MEMBRANE MATERIALS

CROSS REFERENCE TO RELATED APPLICATION

This application claims the benefit of U.S. Provisional Application Ser. No. 61/164,120, filed Mar. 27, 2009, the entire contents of which are hereby incorporated by reference.

FIELD

The present application relates to premixes suitable for the production of membrane materials. More particularly, the present application relates to membrane premixes containing polyvinylamides comprising polymerizable functionalities.

BACKGROUND

Commercial membranes may be produced from a variety of polymeric materials. Examples of useful polymeric materials include poly sulfone (PS), polyether sulfone (PES), polyvinylidene fluoride (PVDF), polyethylene (PE), polypropylene(PP), polytetrafluoroethene (PTFE), polyamides (PA), polyimide (PI), cellulose acetates (CA), and cross-linked polyvinyl alcohols (XPVOH). Additional material examples can be found in *Nanofiltration Principles and Applications* (eds. Schafer; Fane; Waite, Elsevier, Oxford, UK, 2005.)

Many of the engineering thermoplastics, such as PS, PES, and PVDF, exhibit good mechanical, thermal, and chemical resistance properties but suffer from poor hydrophilic, wetting properties. The poor hydrophilicity results in the need for additional agents to improve the hydrophilicity of the substrate, thereby enabling the enhanced permeation of materials into such thermoplastics.

Several strategies can be employed to improve the surface wetting properties of engineering thermoplastics. First, the thermoplastic material can be treated by plasma polymerization of the surface with hydrophilic monomers such as N-vinyl-2-pyrrolidone (VP), vinyl pyridine, thiopene, and the like (*Nanofiltration Principles and Applications*). This method is not ideal due to the exposure of plant production personal to potentially hazardous materials and potential residual fugitive materials after processing. Second, DE-A 19817364 describes a process utilizing two different weight fractions of water soluble polymer. The low molecular weight material washes away, leaving behind the high molecular weight fraction as the hydrophilic additive. This method is not ideal because it does not account for the fact that the high molecular weight, water soluble material is still water soluble. Thus, over time, the hydrophilic agent can still solubilize, thereby reducing the overall permeability of the thermoplastic. Third, WO 94/17906 discloses the utilization of an interpenetrating network (IPN) strategy to entrap polyvinyl pyrrolidone (PVP), a water soluble polymer, into the membrane. However, the physical, solubility of PVP remains unchanged, if only delayed, dampening the long term usefulness of the permeable thermoplastic. This work illustrates the desire of the art to develop materials suitable for enhancing the long term, hydrophilicity of membrane thermoplastic materials.

SUMMARY

The present application discloses a liquid premix comprised of a polyvinylamide containing polymerizable functionalities. In accordance with certain embodiments, the membrane premix is suitable for enhancing the long term hydrophilic properties of the membrane thermoplastic. Examples of useful polyvinylamides containing polymerizable functionalities are further disclosed in WO/2009/023843, the contents of which are hereby incorporated by reference. The present application also describes a hydrophilic agent in a membrane premix suitable for membrane production.

The present application also describes methods for forming membrane materials using the disclosed premixes. In accordance with one aspect a method of forming a membrane material includes the steps of providing a premix composition comprising a polyvinylamide having polymerizable functionalities and a solvent and forming a membrane material from said premix. Methods for forming a membrance from the premix are not particularly limited and can utilize any of the known methods for forming a membrane from a polymeric premix composition.

DETAILED DESCRIPTION

The membrane premixes disclosed herein comprise a polyvinylamide containing polymerizable functionalities in a solvent. The membrane premix may also contain other polymers and additives to modify the properties of the formed membrane.

Polyvinylamides useful in accordance with the present invention include those polymers formed from an N-vinyl amide monomer and containing a polymerizable functionality. In one approach, a dual functional monomer may be employed. In accordance with certain embodiments where the dual functional monomer incorporates glycidyl methacrylate, a third polymerizable monomer is also included. In a second approach, a monomer with polymerizable functionality can be grafted onto a pre-existing, suitable N-vinyl amide co-polymer containing moieties suitable for grafting, yielding a polymeric material comprising a polymerizable functionality.

The term "non-hydrogel polymer" refers to any polymer composition that is capable of forming a substantially solid mass, and that is not comprised of a hydrogel polymer. Non-hydrogel polymers are capable of being solubilized in a solvent and/or monomer and consequently it is possible to measure the molecular weight, via gel permeation chromatography for example, of non-hydrogel polymers. Throughout this description, the term "hydrogel" denotes a polymeric material that is capable of absorbing a solvent, such as water, up to and including its equilibrium content but is incapable of demonstrating a molecular weight, via gel permeation chromatography for example.

The term "polymerizable functionality" refers to a pendant group or bond capable of being polymerized. The term "reactive functionality" refers to functional groups or bonds capable of reacting with another group or bond. Polymerizable functionalities are a subset of reactive functionalities.

The term "N-vinyl amide monomer" refers to monomers including, but not limited to, N-vinyl pyrrolidone, N-vinyl valerolactam, N-vinyl caprolactam, and N-vinyl formamide. N-Vinyl pyrrolidone, N-vinyl formamide, and N-vinyl caprolactam are preferred.

The term "dual functional monomer" refers to monomers having the structure

where Q is an oxirane, oxetane, aziridine, oxazoline, or benzoxazine, E is a polymerizable functionality containing a carbon-carbon double bond and R is an aliphatic and/or aromatic moiety with or without a heteroatom. It is possible to incorporate the monomer into a polymer yielding a free carbon-carbon double bond and/or a free, ionically polymerizable functionality.

In accordance with particular aspects of the present invention the dual functional monomer may be a monomer having the structure

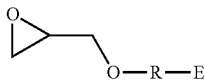

where E is a polymerizable functionality containing a carbon-carbon double bond and R is an aliphatic and/or aromatic moiety with or without a heteroatom. It is possible to incorporate the monomer into a polymer yielding a free, polymerizable double bond and/or free, polymerizable oxirane ring.

The term "glycidyl acrylates" refers to alkyl acrylate monomers having a glycidyl group attached to an alkyl acrylate monomer. Further, the alkyl group can be, but not limited to, a C1-C12 carbon atom. Non limiting examples of suitable alkyl acrylate monomers are the glycidyl (alkyl) acrylates such as, GMA, glycidyl ethacrylate, glycidyl butylacrylate, and glycidyl dodecyl acrylate. Preferred glycidyl (alkyl) acrylates useful in the practice of the present invention include GMA, glycidylethacrylate, glycidylbutylacrylate and glycidyldodecylacrylate. GMA is a particularly useful monomer.

The term "third polymerizable monomer" refers to additional monomers that may be present in the composition including, but not limited to HEMA, vinyl acetate (VA), ethyl acrylate, methyl acrylate, methylmethacrylate, dimethylaminoethyl methacrylate (DMAEMA), dimethylaminopropyl methacrylamide (DMAPMA), acrylamide, methacrylamide, acrylonitrile, cyanoacrylates, ethylene, styrene, maleic anhydride (MAN), acrylic acid (AA), sodium vinylsulfonate, vinylene carbonate, vinyl chloride, 4-vinyl aniline, vinylpyridine, trimethylvinylsilane, vinyl propionate, crotonic acid, polyfunctional acrylate, polyfunctional allyl ether, vinyl imidazole, N-vinyl imidazole, vinyl carbonate and allyl acetate and allyl alcohol. Particularly useful third monomers useful in the practice of certain aspects of the present invention include HEMA, VA, crotonic acid, acrylamide, and MAN. HEMA, MAN, and VA are particularly useful. The third polymerizable monomer can be selected to yield a polymer varied in charge, resulting in an anionic, non-ionic, cationic, or zwitterionic polymeric material.

The term "grafting" refers to the incorporation of a specific functionality, specifically a polymerizable functionality, by chemically attaching said functionality to a pre-existing polymeric material. Desirable reactive functionalities suitable for grafting include, but are not limited to, —$CO_2H$, —OH, -amine, nitrile, thiol, —SH, epoxy, oxetane, aziridine, isocyanate, oxazoline, or benzoxazine and combinations thereof. These moieties can be reacted with suitable graft functional monomers, or mixtures of said monomers, such as —$CO_2H$, —OH, -amine, nitrile, thiol, —SH, epoxy, oxetane, aziridine, isocyanate, oxazoline, or benzoxazine and combinations thereof to yield polymerizable polymers.

In accordance with one aspect of the present invention, a membrane premix including a polymer comprising an N-vinyl amide monomer and a dual functional monomer is disclosed. The polymer comprises:

(a) at least one N-vinyl amide monomer; and (b) at least one dual functional monomer having the structure

where Q is an oxirane, oxetane, aziridine, oxazoline, or benzoxazine, E is a polymerizable functionality containing a carbon-carbon double bond and R is aliphatic and/or aromatic moiety with or without a heteroatom. It is possible to incorporate the monomer into a polymer yielding a free carbon-carbon double bond and/or a free, ionically polymerizable functionality.

In accordance with certain aspects, the dual functional monomer may comprise glycidyl acrylate and a third polymerizable monomer may also present in the composition.

The polyvinyl amide containing a polymerizable functionality described herein can be prepared by techniques known to those ordinarily skilled in the art such as bulk, solution, suspension and emulsion polymerization. Further, those ordinarily skilled in the art understand that the monomers used in preparing the polymer have functional groups which can be preferentially reacted to create a specific polymer for a specific application. Furthermore, it should be understood that reference to a polymer comprising certain monomers refers to the polymer formed as a reaction product of the specified monomers.

Specific dual functional monomers useful in accordance with the present disclosure include, without limitation, allyl glycidyl ether ([(2-propenyloxy) methyl]-oxirane), butadiene monoxide, 2-(1-aziridinyl)ethyl methacrylate, vinyl cyclohexene monoxide, 4-vinyl-1-cyclohexene-1,2-epoxide, 2-Isopropenyl-2-oxazoline, 2-isocyanatoethyl methacrylate, 1,3-diallyl-5-glycidylisocyanurate, glycidyl N-(3-isopropenyl dimethylbenzyl)carbamate, 3-N-(6-propyl vinyl ether) benzoxazine, and 2-(3-methyl-3-oxetanemethoxy) ethyl vinyl ether. More than one dual functional monomer may be used.

Specific graft functional monomers useful in accordance with the present disclosure include, without limitation, dimethylaminoethyl methacrylate, dimethylaminopropylmethacrylamide, maleic anhydride, acrylic acid, vinyl imidazole, 4-vinyl aniline, trimethylvinylsilane, crotonic acid, vinyl sulfone, allyl glycidyl ether ([(2-propenyloxy)methyl]-oxirane), butadiene monoxide, 2-(1-aziridinyl)ethyl methacrylate, vinyl cyclohexene monoxide, 4-vinyl-1-cyclohexene-1,2-epoxide, 2-Isopropenyl-2-oxazoline, 2-isocyanatoethyl methacrylate, 1,3-diallyl-5-glycidylisocyanurate, glycidyl N-(3-isopropenyl dimethylbenzyl)carbamate, 3-N-(6-propyl vinyl ether) benzoxazine, epichlorohydrin, and 2-(3-methyl-3-oxetanemethoxy) ethyl vinyl ether, and vinyl sulfonic acid.

Polymers useful herein can be blended with reactive monomers. Suitable classes of reactive monomers include, but are not limited to, epoxies, oxetanes, aziridines, oxazolines, benzoxazines, acrylates, acetates, maleimides, maleates, fumarates, styreneics, maleic anhydrides, vinyl amides, vinyl ethers, phenolics, cyanate esters, and the like.

Polymers in accordance with certain aspects of the present invention may be non-ionic, anionic, or cationic. Furthermore, polymers or compositions containing the polymers may be in powder, solid, liquid or solution form. The polymers in accordance with certain embodiments are non-hydrogel polymers. Compositions comprising the polymer may be curable via UV radiation, electron beam, or gamma irradiation. The polymers may be utilized in the formulation of aqueous, hydrophilic, UV curable coatings or in 100% solid, UV curable coatings. Compositions comprising the polymer may be thermally and/or cationically curable or thermally and/or anionically curable. Polymer compositions may be free radically curable. The polymers or compositions containing the polymers may be thermoplastic polymers that can be produced in either liquid or powder form. Moreover, the membrane premixes described herein may be suitable for extrusion and capable of forming extruded plastics.

Additional suitable additives include free radical initiators: 2,4,6-trimethylbenzoyl diphenyl phosphine oxide, ethyl(2,4,6-trimethylbenzoyl)phenyl phosphinate, 1-hydroxycylcohexyl phenyl ketone, 2-hydroxy-2-methyl-1-phenylpropanone, 2-isopropyl thioxanthone, 2,4-diethylthioxanthone, 2-methyl-1-[4-(methylthio)phenyl]-2-morpholinopropan-1-one, benzophenone, mixtures of benzophenones, 4-methyl benzophenone, 4-phenyl benzophenone, methyl-o-benzoylbenzoate, methylbenzoylformate, 2,2-dimethoxy-2-phenylacetophenone, 4-benzoyl-4'-methyldiphenylsulphide, 2,2'-bis-(2-chlorophenyl)-4,4',5,5'-tetraphenyl-1,2'-biimidazole, 4,4'-bis(diethylamino) benzophenone, 4,4',4"-methylidynetris(N,N-dimethyl aniline), hydrogen peroxide, 2,2'-azobisisobutyronitrile (AIBN) and other "azo" type initiators, t-butylperoxypivalate and other "peroxide" type initiators, and 2-hydroxy-2-methyl-1-(4t-butyl)phenyl propanone.

Suitable amine synergists include 2-dimethylamino-ethyl benzoate, ethyl-4-(dimethylamino)benzoate, and 2-ethylhexyl-4-dimethylaminobenzoate.

Suitable polymeric photoinitiators include di-ester of carboxymethoxy-benzophenone and polytetramethyleneglycol 250, di-ester of carboxymethoxy thioanthone and polytetramethyleneglycol 250, polyethylene glycol(200)di(beta-(4 (acetylphenyl)piperizine))propionate, poly(ethylene glycol) bis(p-dimethylamino benzoate, and piparazino based aminoalkylphenone.

Examples of suitable cationic photoinitiators include 10-biphenyl-4-yl-2-isopropyl-9H-thioanthen-10-ium hexafluorphospate, 4,4'-dimethyl-diphenyl iodonium hexafluorophospate, mixed triarylsulfonium hexafluorophosphate salts, and reaction products of polyol and 10-(2-carboxymethoxy)-biphenyl-4-yl-2-isopropyl-9-oxo-9H-thioxanthen-10-ium hexafluorophosphate. These examples are understood to be non-limiting. Examples of suitable co-reactants include vinyl ethers, organic oxirane and oxetane compounds, anhydrides, and other suitable co-reactants as outlined in the Handbook of Epoxy Resins by Lee and Neville (McGraw Hill, New York, 1967), which is hereby incorporated by reference in its entirety.

Examples of suitable mono-functional monomers include 2-phenoxy ethyl acrylate (PHEA), 2-(2-ethoxyethoxy)ethyl acrylate (EOEOEA), lauryl acrylate (LA), Stearyl acrylate (SA), isobornyl acrylate (IBOA), acrylic acid-2-ethylhexyl ester, acryloyl morpholine (ACMO), cyclic trimethylolpropane formal acrylate (CTFA), C8-C10 acrylate (ODA), isodecyl acrylate (ISODA), lauryl methacrylate (LM), hydroxyl ethyl methacrylate (HEMA), hydroxyl ethyl acrylate (HEA), and stearyl methacrylate (SM).

Examples of suitable di-functional monomers include 1,6-hexanediol diacrylate (HDDA), dipropylene glycol diacrylate (DPGDA), tripropylene glycol diacrylate (TPGDA), 1,4-butanediol diacrylate (BDDA), 1,9-nonanediol diacrylate (NNDA), neopentyl glycol diacrylate (NPGDA), propoxylated neopentyl glycol diacrylate (NPG2PODA), polyethylene glycol (200) diacrylate (PEG(200)DA), polyethylene glycol (400) diacrylate (PEG(400)DA), polyethylene glycol (600) diacrylate (PEG(600)DA), ethoxylated bisphenol-A diacrylate (BPA2EODA), triethylene glycol diacrylate (TEGDA), triethylene glycol dimethacrylate (TEGDMA), diethylene glycol dimethacrylate (DEGDMA), and ethoxylated bisphenol-A dimethacrylate (BPA10EODMA).

Examples of suitable tri-functional monomers include trimethylolpropane triacrylate (TMPTA), pentaerythritol triacrylate (PET3A), ethoxylated tri-methylolpropane triacrylate (TMP3EOTA), propxylated tri-methylolpropane triacrylate (TMP3POTA), propoxylated glyceryl triacrylate (GPTA), trimethylolpropane trimethylacrylate (TMPTMA), and ethoxylated trimethylolpropane trimethacrylate (TMP3EOTMA). Examples of multifunctional monomers include pentaerythritol tetraacrylate (PETA) and dipentaerythritol hexaacrylate (DPHA).

Suitable premix solvents can be identified in the Industrial Solvents Handbook, 4ed. edited by E. W. Flick (Noyes Daya Corp, Park Ridge, N.J., 1991). Additional insight to solvent selection is also available in the Polymer Handbook, 4ed. edited by J. Brandrup, E.H. Immergut, and E. A. Grulke (John Wiley, New York, 1999). In the Polymer Handbook, and of particular utility, is *Solubility Parameters Values* by E. A. Grulke. Blends of suitable solvents are also acceptable.

These references are understood to be incorporated in their entirety.

A critical selection criteria for an acceptable solvent is the ability to properly solvate the desired polymer. Chemists faced with such challenges will often seek solubility parameter information for the solvent and polymers to develop an early opinion of the merits of individual products. In general, solvents and polymers that are similar in solubility parameter will be well suited for making good, stable solutions. One of ordinary skill in the art can readily determine the concentrations of the polymer solutions that will work best for a particular process. Typically, the solvent comprises about 50 to 90%, more particularly about 60 to 80%, by weight of the premix. Presented below is solubility parameter information related to solvents.

Solubility Parameter Data for Various Industrial Solvents (Polymer Handbook)

| Solvent | Solubility Parameter $\delta$ (MPa$^{1/2}$) |
|---|---|
| N-methyl-2-pyrrolidone (NMP) | 23.1 |
| N,N-dimethylacetamide (DMAC) | 22.1 |
| Dimethyl formamide (DMF) | 24.8 |
| Butyrolactone (BLO) | 25.8 |
| Polyethylene glycol 400 | 23 |
| Alcohols (common) | 20 to 30 |
| Tetrahydrofuran (THF) | 18.6 |
| 2-Pyrol (2-Py) | 28.4 |
| Dimethyl sulfoxide | 29.7 |
| Acetone | 20.3 |
| Formamide | 19.2 |
| Water | 47.9 |

In addition to the solubility parameter, other properties of importance include boiling point, water solubility, vapor pressure, viscosity, and toxicity. Solvent recyclability, common for NMP, and cost are also considerations. In some processes, a "non-solvent" is desirable, possibly to induce an asymmetrical feature to the product. The most common "non-solvent" is water.

In an embodiment of the invention, the polyvinylamide polymer is comprised of 19-80 wt % of a N-vinyl amide monomer, 1-25 wt % of an alkyl acrylate monomer having a functional group wherein the functional group is selected from a glycidyl group or mixtures thereof; and 1-80 wt % of a third polymerizable monomer.

In another embodiment of the invention, the polyvinylamide polymer is comprised of 27-70 wt % of a N-vinyl amide monomer, 3-20 wt % of an alkyl acrylate monomer having a functional group wherein the functional group is selected from a glycidyl group or mixtures thereof, and 5-60 wt % of a third polymerizable monomer.

In a further embodiment of the invention, the polyvinylamide polymer is comprised of 45-60 wt % of a N-vinyl amide monomer, 5-15 wt % of an alkyl acrylate monomer having a functional group wherein the functional group is selected from a glycidyl group or mixtures thereof, and 10-50 wt % of a third polymerizable monomer.

In a further embodiment of the invention, the polyvinylamide polymer is comprised of 5-95 wt % of a N-vinyl amide monomer and 95-5 wt % dual functional monomer, provided the dual functional monomer is not a glycidyl acrylate.

In a further embodiment of the invention, the polyvinylamide polymer is comprised of 20-80 wt % of a N-vinyl amide monomer and 80-20 wt % dual functional monomer, provided the dual functional monomer is not a glycidyl acrylate.

In a further embodiment of the invention, the polyvinylamide polymer is comprised of 40-60 wt % of a N-vinyl amide monomer and 60-40 wt % dual functional monomer, provided the dual functional monomer is not a glycidyl acrylate.

In a further embodiment of the invention, the polyvinylamide polymer is comprised of 10-90 wt % of a N-vinyl amide monomer and 85-9 wt % at least one co-monomer comprising a chemical moiety suitable for grafting and 1-5% of a graft functional monomer.

In a further embodiment of the invention, the polyvinylamide polymer is comprised of 20-80 wt % of at least one N-vinyl amide monomer and 79-9 wt % at least one co-monomer comprising a chemical moiety suitable for grafting and 1-11% of at least one graft functional monomer.

Additional insight to possibilities for polyvinylamides containing polymerizable functionalities suitable for membrane premixes are disclosed in WO/2009/023843. This reference is understood to be incorporated in its entirety.

It is envisioned that other functional polymers, such as polyamines, polyimines, carboxylated polymers, hydroxylated polymers, carboxylated acrylates, amine functional acrylates and the like can be incorporated into the premix. Other polymers and reactive functionalities will be suitable for glycidyl functional materials such as those presented in the Lee & Neville *Epoxy Handbook*.

There are many additives that can be used in membrane production. These additives are often the essential components to the function of the product. Additives such as hydrophilic polymers, pore formers, and salts are common These materials provide for and adjust the nature of the membrane polymer. For example, membranes used in contact with water, many of which are constructed out of structural polymers that are inherently hydrophobic (exhibiting poor wetting properties to water) may include additives to improve functionality. Additives may be used in such cases to improve the inherent permeability and anti-fouling properties of such structural polymers.

Various methods can be used to form membrane materials from the premix. A common process involves the manufacture of hollow fibers. In this process, the solvent is used to solubilize the polymeric materials. Usually, there will be other components, such as salts and glycols. This multi-polymer multi-component system is then extruded, often while air or liquid is forced through the inner fiber core. Once the hollow fiber is formed, the fiber exits the spinneret and is placed into a precipitation bath. The precipitation bath typically includes a "non-solvent" such as water and/or glycol. The bath can be elevated in temperature to effect the morphology (physical structure) of the fiber during the precipitation process. The net result is that the solvent migrates to the bath, yielding a density varied structure. Most fibers are asymmetric, meaning that either the inner surface or the outer surface is more dense, thereby improving the separation capability of the product. Once the fiber exits the bath, it is usually wound, then cut and bundled for placement in a membrane module.

In accordance with another process known as float casting, the membrane premix solution is allowed to pass through a casting knife or slot die. Upon exiting the knife, the solution is placed, gently, onto the surface of the precipitation bath, which is often water. The membrane solution will reach a gelled state. The gelled material is carefully drawn so that the solution to gel material is continuous.

In the drum casting process, the membrane premix solution is introduced to a fabric support roll via a solution trough. Upon passing a doctor blade, the membrane premix solution enters the precipitation bath, gel tank, and ultimately passes through a rinse tank. This process is common for the production of flat sheet membranes.

In accordance with another process known as the extrusion and stretching membrane forming process, the polymer premix is melt extruded from a die. Upon exiting the die, the film is drawn and stretched to induce micropores.

The practice of the present invention is illustrated by the following non-limiting examples:

EXAMPLE 1

VP/vinyl acetate/glycidyl methacrylate may be added to N-methyl-2-pyrrolidone (NMP) (40:60 parts) to prepare a membrane premix.

Compositions of VP/VA/GMA in NMP at 40% solids were measured to have Brookfield viscosities of about 2400 cps and 1375 cps for mole ratios of 66/12/22 and 77.2/14.2/8.6, respectively at 25 C.

EXAMPLE 2

To tetrahydrofuran (THF) is added VP/vinyl acetate/glycidyl methacrylate (80:20 parts) to prepare a membrane premix.

EXAMPLE 3

Employing the teachings of U.S. Pat. No 7,300,022 B2 (the contents of which are hereby incorporated by reference), the following premix can be prepared:

To N-methyl-2-pyrrolidone (NMP), poly sulfone, lithium chloride, a polymer of vinyl pyrrolidone (VP)/vinyl acetate (VA)/glycidyl methacrylate (GMA) and Gantrez AN-119 (copolymer of maleic anhydride/methyl vinyl ether) (74:17:3.5:2.7:3.1 parts) can be added to form a membrane premix. The general structure of VP/VA/GMA is presented below where x+y+z=100.

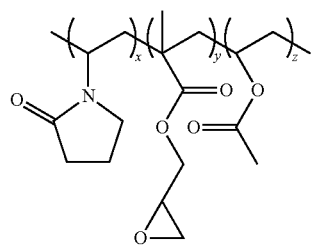

Polymer of Vinyl Pyrrolidone/Vinyl Acetate/Glycidyl Methacrylate

Additional examples of suitable polysulfones include Solvay's Udel P-1700 NT, P-1700 NT LCD, P-1710, P-1720, P-1800, P-1835, P-3500 NT LCD, P-3703 as well as other similar commercial polysulfone materials.

EXAMPLE 4

Employing the teachings of U.S. Pat. Appl. No. 2001/0006160 A1 (the contents of which are hereby incorporated by reference), the following premix can be prepared:

To a blend of caprolactam, butyrolactone, and glycerol (0.47:0.47:0.055) solvents, one can add polyether sulfone, a polymer of VP/vinyl acetate/glycidyl methacrylate, and Gantrez AN-119 (copolymer of maleic anhydride/methyl vinyl ether) (0.57:0.42:0.01 parts) to form a premix.

EXAMPLE 5

To N-methyl-2-pyrrolidone (NMP), one can add poly sulfone, lithium chloride, a polymer of VP/vinyl acetate/glycidyl methacrylate and 100% hydrolyzed polyvinyl alcohol (74:17:3.5:2.7:3.1 parts) to form a premix.

EXAMPLE 6

Copolymer of Vinyl Pyrrolidone/Lauryl Methacrylate/Glycidyl Methacrylate-g-Acrylic Acid/Acrylic Acid To N-methyl-2-pyrrolidone (NMP), one can add polysulfone, lithium chloride, and a polymer of vinyl pyrrolidone/acrylic acid/lauryl methacrylate/glycidyl methacrylate (see below where x+y+z+a=100.) (74:17:3.5:5 parts) to form a premix.

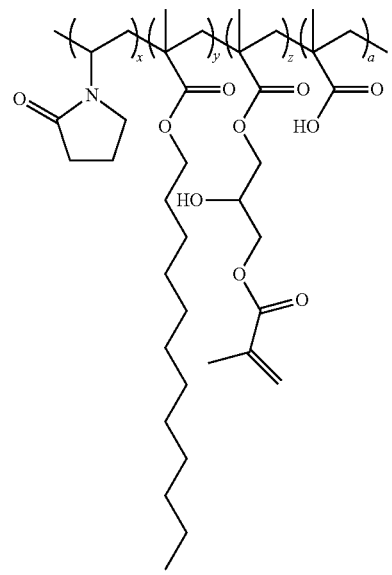

Polymer of Vinyl Pyrrolidone/Acrylic Acid/Lauryl
Methacrylate/Glycidyl Methacrylate

EXAMPLE 7

To N-methyl-2-pyrrolidone (NMP), one can aadd poly sulfone, lithium chloride, polyvinyl pyrrolidone-co-vinyl acetate (PVP/VA S-630) and a polymer of VP/acrylic acid/lauryl methacrylate/glycidyl methacrylate (74:17:3.5:3:3 parts) to form a premix.

EXAMPLE 8

To N-methyl-2-pyrrolidone (NMP), one can add poly sulfone, lithium chloride, polyvinyl polypyrrolidone) (PVPP) and a polymer of VP/acrylic acid/lauryl methacrylate/glycidyl methacrylate (74:17:3.5:3:3 parts) to form a premix.

EXAMPLE 9

To N-methyl-2-pyrrolidone (NMP), one can add VP/acrylic acid/lauryl methacrylate/glycidyl methacrylate (74:26 parts) to form a premix.

EXAMPLE 10

Employing the teachings of Riffle et. al. in *Polymer* 49 (2008) 2243-2252 (the contents of which are hereby incorporated by reference), the following premix can be prepared:

A 10 wt % solution of phenoxide-endcapped poly(arylene ether sulfone) or (disulfonated poly(arylene ether sulfone)) can be constructed in N-methyl-2-pyrrolidone (NMP). To this solution, a polymer of VP/vinyl acetate/glycidyl methacrylate at various weight concentrations can be added. Optionally, polyvinyl pyrrolidone (K-value ranging from K-12 to K-120) may be added. Further optional additives include Poly(arylene ether sulfone), poly ether sulfone, polysulfone, polyethylene glycol (PEG 200 to 5000), inorganic salts (i.e., lithium chlorides), and co-solvents. Additional additives can be found in *Nanofiltration Principles and Applications* (eds. Schafer; Fane; Waite, Elsevier, Oxford, UK, 2005.).

This solution can then be processed into a hollow fiber, flat sheet, or other membrane structure.

EXAMPLE 11

Employing the teachings of Riffle et. al. in *Polymer* 49 (2008) 2243-2252 (the contents of which are hereby incorporated by reference), the following premix can be prepared:

Membrane premix number 1: A 10 wt % solution of phenoxide-endcapped poly(arylene ether sulfone) or (disulfonated poly(arylene ether sulfone)) can be constructed in N-methyl-2-pyrrolidone (NMP). Optional additives include poly ether sulfone and polysulfones.

Membrane premix number 2: A polymer of VP/vinyl acetate/glycidyl methacrylate, also in NMP, at various weight concentrations can be added. Optionally, polyvinyl pyrrolidone (K-value ranging from K-12 to K-120) can be added. Further optional additives include polyethylene glycol (PEG 200 to 5000), inorganic salts (i.e., lithium chlorides), and co-solvents.

Membrane premix number 1 and membrane premix number 2 may then be co-mixed immediately prior to fiber spinning, flat sheet constructing, or other membrane structure manufacturing. During this co-mixing, temperature can be employed to enhance the reaction of disulfonated poly (arylene ether sulfone) and VP/VA/GMA polymer.

EXAMPLE 12

Employing the teachings of Zhang et. al. in *Front. Chem. Eng. China,* 2009, 3(3): 265-271 (the contents of which are hereby incorporated by reference), the following premix can be prepared:

To N-methyl-2-pyrrolidone (NMP), one can add polyether sulfone, $Al_2O_3$ (0.8 μm), and a polymer of VP/vinyl acetate/glycidyl methacrylate (35-40:6-10:50-54:0.5-1 parts). Optionally included is polyvinyl pyrrolidone (PVP) or other lactamic polymer or copolymer. An alumina hollow fiber membrane may be formed.

EXAMPLE 13

Employing the teachings of Bil'dyukevich et. al. in *Theor. Found. Chem. Eng.*, 2009, 43(4): 517-521 (the contents of which are hereby incorporated by reference), the following premix can be prepared:

A polymer composite comprising polysulfone, PEG, and VP/VA/GMA (18/10/1.25) can be spun into a fiber utilizing the solvent dimethyl acetamide.

EXAMPLE 14

Employing the teachings of Kang et. al. in *J. Mem. Sci.*, 2004, 236: 203-207 (the contents of which are hereby incorporated by reference), the following premix can be prepared:

A solution of polyimide (PI; P-84, Lenzing) can be precipitated in methanol. The dried PI can then be resolubilized at 15 wt % in gamma-butyrolactone. To this solution, 3 wt % of VP/GMA copolymer can be added. The resulting mixture can be cast into a membrane via phase inversion.

Optional components in this solution include polyamic acids, polyamide-imides, and poly(amic acid-co-imide).

EXAMPLE 15

Copolymer of Vinyl Pyrrolidone/Glycidyl
Methacrylate/Vinyl Acetate/Glycidyl
Methacrylate-g-Vinyl Alcohol To gamma-butyrolactone, one can add vinyl pyrrolidone/vinyl acetate/vinyl alcohol/glycidyl methacrylate (60:40 parts) to form a premix. A structure of this polymer is presented below where $x+y+z+a=100$.

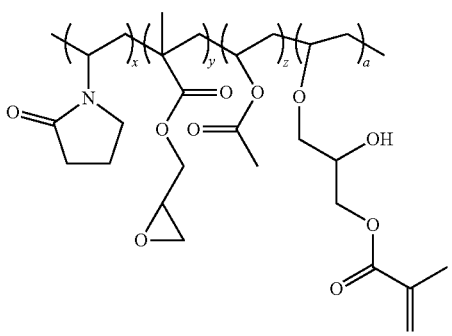

Polymer of Vinyl Pyrrolidone/Vinyl Acetate/Vinyl Alcohol/Glycidyl Methacrylate

EXAMPLE 16

To N,N-dimethylacetamide (DMAC), one can add VP/vinyl acetate/glycidyl methacrylate (60:40 parts) to form a premix.

EXAMPLE 17

To N,N-dimethylformamide (DMF), one can add VP/acrylic acid/lauryl methacrylate/glycidyl methacrylate (60:40 parts) to form a premix.

EXAMPLE 18

Copolymer of Glycidyl Methacrylate-g-Hydroxyethyl Methacrylate/Vinyl Pyrrolidone/Vinyl Acetate To N-methyl-2-pyrrolidone (NMP), one can add vinyl pyrrolidone/hydroxyethyl methacrylate/glycidyl methacrylate (60:40 parts) to form a premix. A general structure is presented below where w+x+z=100.

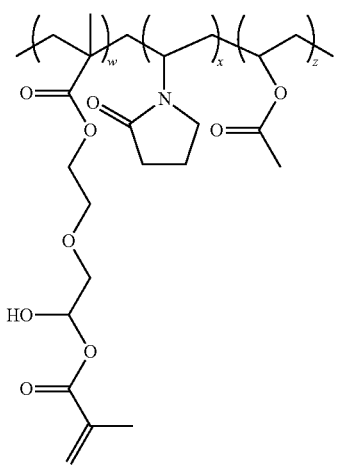

Polymer of Vinyl Pyrrolidone/Vinyl Acetate/HEMA/GMA

EXAMPLE 19

Copolymer of Vinyl Pyrrolidone/Glycidyl Methacrylate-g-Vinyl Alcohol

To N-methyl-2-pyrrolidone (NMP), one can add vinyl pyrrolidone/vinyl alcohol/glycidyl methacrylate (60:40 parts) to form a premix. A general structure for the polymer is presented below where x+z=100.

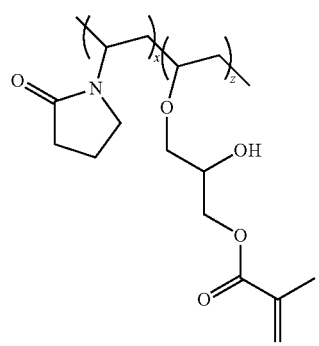

Polymer of Vinyl Pyrrolidone/Vinyl Alcohol/Glycidyl Methacrylate

EXAMPLE 20

To N-methyl-2-pyrrolidone (NMP), one can add VP/acrylic acid/glycidyl methacrylate (60:40 parts) to form a premix.

EXAMPLE 21

To N-methyl-2-pyrrolidone (NMP), one can add vinyl caprolactam (VCap)/acrylic acid/glycidyl methacrylate (60:40 parts) to form a premix.

EXAMPLE 22

To N-methyl-2-pyrrolidone (NMP), one can add VCap/vinyl acetate/glycidyl methacrylate (60:40 parts) to form a premix. A general structure for the polymer is presented below where x+y+z=100.

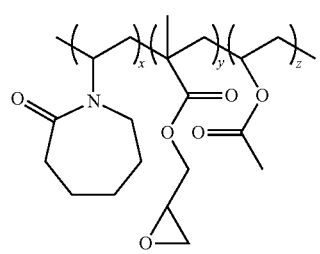

Polymer of Vinyl Caprolactam/Vinyl Acetate/Glycidyl Methacrylate

Compositions of VCap/VA/GMA in NMP at 40% solids were measured to have Brookfield viscosities of about 900 cps and 502 cps for mole ratios of 66/12/22 and 77.2/14.2/8.6, respectively at 25 C.

EXAMPLE 23

To N-methyl-2-pyrrolidone (NMP), one can add VP/glycidyl methacrylate (60:40 parts) to form a premix.

EXAMPLE 24

To N,N-dimethylacetamide (DMAC), one can add VCap/glycidyl methacrylate (60:40 parts) to form a premix.

EXAMPLE 25

To N-methyl-2-pyrrolidone (NMP), one can add VCap/vinyl alcohol/glycidyl methacrylate (60:40 parts) to form a premix.

EXAMPLE 26

Copolymer of Maleic Acid/Vinyl Pyrrolidone/Glycidyl Methacrylate-g-Maleic Acid

To N,N-dimethylacetamide (DMAC), one can add vinyl pyrrolidone/maleic anhydride/glycidyl methacrylate (60:40 parts) to form a premix. A general structure for the polymer is presented below where w+x+y=100.

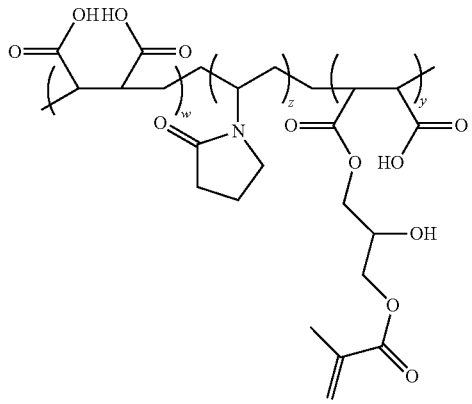

Polymer of Vinyl Pyrrolidone/Maleic Anhydride/Glycidyl Methacrylate

EXAMPLE 27

Employing the teachings of Guan et. al. in *Poly. Bulletin* 54 (2005) 21-28 (the contents of which are hereby incorporated by reference), the following premix can be prepared:

A 10 wt % solution of sulfonated polyether sulfone can be constructed in N-methyl-2-pyrrolidone (NMP). To this solution, a polymer of VP/vinyl acetate/glycidyl methacrylate at various weight concentrations can be added. Optionally, polyvinyl pyrrolidone (K-value ranging from K-12 to K-120) can be added. Further optional additives include Poly(arylene ether sulfone), poly ether sulfone, polysulfone, polyethylene glycol (PEG 200 to 5000), inorganic salts (i.e., lithium chlorides), and co-solvents. This solution can then be processed into a hollow fiber, flat sheet, or other membrane structure.

EXAMPLE 28

Employing the teachings of US Pat. App. No. 2002/0046970 A1 (the contents of which are hereby incorporated by reference), the following premix can be prepared:

A polymer solution of polyvinylidene fluoride, VP/GMA, and N-dimethylacetamide (DMAC) (18:9:73 parts) can be prepared as a membrane pre-mix solution.

EXAMPLE 29

Employing the teachings of US Pat. App. No. 2002/0046970 A1 (the contents of which are hereby incorporated by reference), the following premix can be prepared:

A polymer solution of polyacrylonitrile, VP/GMA, water, and, N-dimethylacetamide (DMAC) (15:5:1:79 parts) can be prepared as a membrane pre-mix solution.

EXAMPLE 30

Employing the teachings of U.S. Pat. No 7,300,022 B2 (the contents of which are hereby incorporated by reference), the following premix can be prepared:

To N-methyl-2-pyrrolidone (NMP), one can add poly sulfone, lithium chloride, a polymer of vinyl pyrrolidone (VP)/vinyl acetate (VA)/glycidyl methacrylate (GMA) and Gantrez S-97 (copolymer of maleic acid/methyl vinyl ether) (74:17:3.5:2.7:3.1 parts) to form a premix.

What is claimed is:

1. A premix composition represented by the following structure:

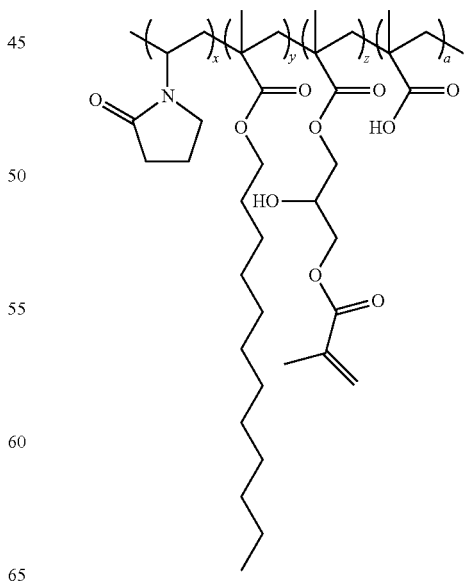

wherein x+y+z+a=100.

2. A premix composition represented by the following structure:
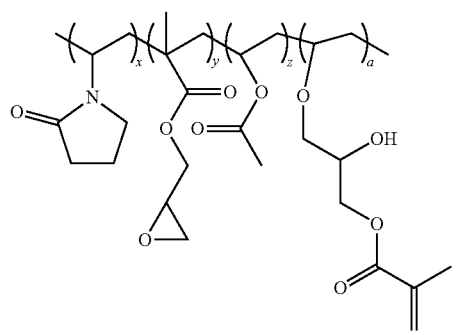
wherein x+y+z+a=100.
3. A premix composition represented by the following structure:
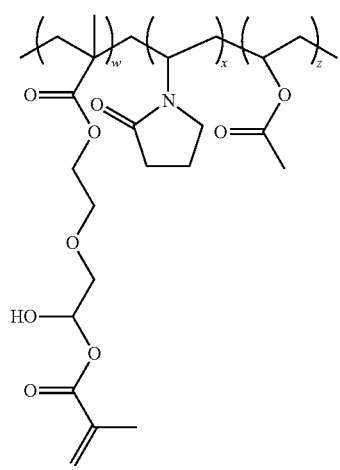
wherein w+x++z=100.
4. A premix composition represented by the following structure:
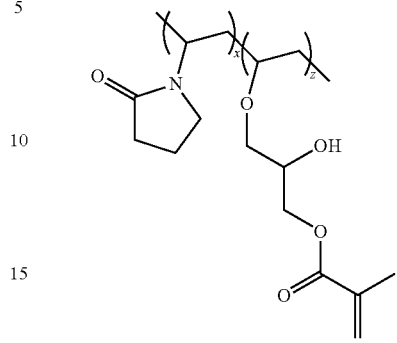
wherein x+z=100.
5. A premix composition represented by the following structure:
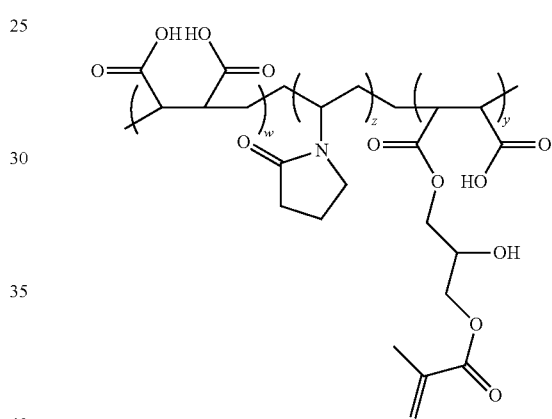
wherein w+z++z=100.
* * * * *